UNITED STATES PATENT OFFICE.

JÖRGEN SIMMONS, OF APPLETON, MINNESOTA.

FOOD PRODUCT.

SPECIFICATION forming part of Letters Patent No. 577,629, dated February 23, 1897.

Application filed May 20, 1895. Serial No. 550,003. (No specimens.)

*To all whom it may concern:*

Be it known that I, JÖRGEN SIMMONS, of Appleton, Swift county, State of Minnesota, have invented a new Food Product from Wheat and a Process for Producing the Same; and I do hereby declare the following to be a clear and full description of the invention, such as will enable others skilled in the art to which it pertains to produce and use it.

My invention relates to a food product derived from wheat and presents a new article of manufacture; and it consists of combining a large per cent. of wheat germs, purified middlings, and shorts; and the object of my invention is to produce a specific medicinal or remedial but not a medicated food, especially adapted as a pleasant tasting and effective laxative and easily assimilating, highly nutritive, and remedial food for persons suffering with dyspepsia and its resultant diseases, for invalids, convalescents, and as a general breakfast food.

I am aware that the laxative properties of germ-shorts are of common knowledge, but that a cheap Graham flour for all purposes has heretofore been produced by combining the germ middlings of wheat with red shorts, which are then reground and rebolted to remove the coarse particles and present a fine granulated flour for general uses; also, I am aware that corn-flour, wheat-middlings, and bran-dustings have heretofore been combined to produce a fine granulated cheap flour for general purposes; but I have discovered that the germs of the wheat-berry, with their germinating-oils and phosphoric elements, when combined with the middlings, shorts, and cerealin of the berry in proper proportions, conditions, and granulations, produce a mild but effective laxative, a new and valuable food product, involving safe and pleasant remedial elements, which is highly nutritious and of easy assimilation, thus producing a very palatable, safe, and natural food remedy especially adapted for people of sedentary habits, dyspeptics, invalids, and convalescents.

The word "cerealin" is herein used in reference to a small globular formation found only between the inner and outer coverings (ordinarily known as the "bran") of the wheat-berry. These globules can only be seen by the aid of the microscope, and their chemical and medicinal properties are not fully known, but are believed to be of a laxative nature.

I find that I obtain the best results as to the remedial qualities of the food by combining the greatest proportion I can obtain in the process described of the cerealin elements of the wheat-berry.

I find that I can secure the material from an ordinary modern flouring-mill, the one with which I have had the best results having six sets of double rolls, and I also find that owing to the amount of germ tailings or shorts required I can only obtain about ten pounds of my food product, in all its parts, from one hundred pounds of wheat.

My food product contains about ten times as much of the cerealin and germs as are in an equal amount, by weight, of wheat and a much larger excess of the same over all grades of flour. I thus produce a nutritious and highly-valuable laxative food largely from the shorts, which I utilize for human food at a much higher price than the best grade of flour, instead of selling the same at low prices for animal food, thus greatly increasing the value of the output of the mills which produce my food product.

The wheat from which to produce my food product should be of good quality, and it must be brushed and thoroughly cleaned from all foreign seeds, but the outer covering and germs are not to be removed until in the regular process of reduction.

I find that I can best secure the material for producing my food product by using the germ-tailings from the first (smooth) sizing-rolls, then treating them, as hereinafter specified, and combining them when thus treated with first-germ middlings, purified, and purified middlings from the second and third break, as hereinafter set forth; but I do not confine myself to this method hereinafter set forth for producing my food product. The methods by which I produce, select, prepare, and combine the materials for my food product are not the elements of my invention, which consists in the food product as herein set forth.

The first mill product which enters into my food product that I will present here is the germ-tailings with shorts which come from the first (smooth) sizing-roll, thence the mass is conveyed to the germ round wheel, thence to the germ-purifier, and there passes over silk bolting-cloth numbered from No. 1 (one) to No. 0000. This material as used by me in my food product is different from the ordinary germ-tailings. In ordinary milling this stock after having been treated as above stated passes to other sets of rolls and purifiers, so that as I use this stock it is coarser and contains more of the germs, gluten, and low-grade flour than do the ordinary tailings. The proportion of this cerealin germ-tailings which I find produces the best results is about forty per cent. of the food product, by weight, when combined for use. If too much of this stock is used, the food product becomes too coarse and active as a cathartic, and in this event lacks nutriment and has an unpleasant germ or almond-like flavor. For specific cases of constipation a slight excess of this material over the above proportion might be used. If, owing to defective condition of the wheat being milled, these tailings contain less than the normal amount of germ-shorts, the laxative properties of this element may be restored or defective milling remedied by adding to the food product ten or fifteen per cent., by weight, of the second-germ sizing-rolls tailings.

The second mill-stock which enters into my food product is what is known as "first-germ middlings" and are the product of the first, second, and third break, fully purified, preferably by passing through numbers one (1) to 000 silk bolting-cloth of the germ-middlings purifier, thus freeing it of all dust-flour and impurities. When thus treated, it is in proper condition for combining for producing my food product.

By using specially-constructed milling devices or appliances the materials for my food product might be obtained from these two stocks, but in practice I find it better to take about forty per cent., by weight, of the combined product of this last-designated material and add twenty per cent., by weight, of the combined product, of what is known as "second" and "third" break purified middlings, which are produced by the same processes as are the first-germ middlings, with the exception that the cloths used for the same and through which it passes are No. 2, No. 1, and No. 0. I also find an excess of cerealin in this material over that of the other stocks named, which I count as a very important factor in my food product.

In case good wheat has been used and proper milling apparatus and skill employed and the above-described materials properly produced and combined in the manner and proportion as set forth the product will present my invention.

In selecting and preparing these several materials for my food product I have specified the materials in the proportions, granulations, and conditions that I find produce the best results; but these specifications may be departed from either as to any one or all of the materials, either as to proportion used, coarseness or fineness of their granulations, or as to the condition of any or all of them as to whether they were or were not purified within limits largely determined by the condition and quality of the wheat used without effecting a departure from my invention.

The wheat which I prefer for my food product is known as "No. 1 hard" or "No. 1 northern."

I obtain the best results when all the materials of my food product have been thoroughly purified and cleaned of all flour and dust, so that it will run through the fingers of one's hand like dry sand, leaving but a trace of flour-dust; but while this purified and cleaned condition is preferable and contributes to the best results it is not indispensable to good results, which can be obtained without purifying or cleaning all or even any of the materials.

In cooking my food one part of the same, by measure, is added to two parts of boiling water by being slowly sifted in and stirred for ten minutes while cooking, then place the dish upon the stove where it will not scorch, but keep up a boiling heat for fifteen or twenty minutes, when the same is ready for the table.

The food is of a pleasant flavor and of about the consistency of oatmeal food, but if the materials or any of them are too fine or too coarse the food will be more or less heavy and sticky or too fibery, and if the substance, granulations, and proportions above indicated are materially departed from the food will present an unpalatable, heavy, viscid mass, thus impairing or losing the good medicinal and cooking qualities, consistency, and flavor which it will possess when properly prepared, compounded, and cooked.

Having thus described my discovery and invention, what I claim as new and valuable, and for which I desire to obtain Letters Patent, is—

1. In a laxative nutritious food derived from wheat the combination of coarsely-granulated first-germ middlings with coarsely-granulated second and third break middlings, and coarsely-granulated cerealin germ-shorts, as and for the purposes substantially as set forth.

2. In a laxative nutritious food derived from wheat the combination of about forty per cent. by weight, of coarsely-granulated purified cerealin and germ-shorts, with about forty per cent. of coarsely-granulated purified first-germ middlings, and about twenty per cent. of the second and third break purified middlings coarsely granulated, as and for the purposes substantially as set forth.

In testimony of which I hereunto affix my signature in the presence of two witnesses.

JÖRGEN SIMMONS.

Witnesses:
P. L. RING,
T. H. ENDERSEN.